United States Patent
Li et al.

(10) Patent No.: US 9,735,813 B2
(45) Date of Patent: Aug. 15, 2017

(54) METHOD AND APPARATUS FOR SIGNAL EDGE BOOSTING

(71) Applicant: Intel Corporation, Santa Clara, CA (US)

(72) Inventors: Shenggao Li, Pleasanton, CA (US); Xiaoqing Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/084,329

(22) Filed: Mar. 29, 2016

(65) Prior Publication Data

US 2016/0315642 A1    Oct. 27, 2016

Related U.S. Application Data

(63) Continuation of application No. 14/446,664, filed on Jul. 30, 2014, now Pat. No. 9,379,743.

(51) Int. Cl.
*H04L 25/03* (2006.01)
*H04B 1/04* (2006.01)
*H04B 10/50* (2013.01)
*H04L 25/02* (2006.01)

(52) U.S. Cl.
CPC ......... *H04B 1/0475* (2013.01); *H04B 10/503* (2013.01); *H04L 25/0272* (2013.01); *H04L 25/03878* (2013.01)

(58) Field of Classification Search
CPC .............................. H03K 5/135; H04B 1/0475
See application file for complete search history.

(56) References Cited

U.S. PATENT DOCUMENTS

| | | | | |
|---|---|---|---|---|
| 6,549,045 B1* | 4/2003 | Wang | ........................ | G06F 1/08 327/115 |
| 6,897,685 B2* | 5/2005 | Sato | ..................... | H04L 25/0278 326/82 |
| 7,286,620 B2* | 10/2007 | Cranford, Jr. | ..... | H04L 25/03133 375/229 |
| 7,319,705 B1* | 1/2008 | Wu | ...................... | G06F 13/4072 370/534 |
| 7,327,814 B1* | 2/2008 | Xu | ..................... | H04L 25/03878 375/295 |
| 7,692,447 B2* | 4/2010 | Cranford, Jr. | ........ | H03K 17/164 326/30 |
| 8,549,057 B1* | 10/2013 | Hsieh | .................. | G06F 15/7871 375/232 |
| 2005/0286641 A1* | 12/2005 | Cao | ................... | H04L 25/03878 375/240.26 |
| 2007/0047667 A1* | 3/2007 | Shumarayev | ........... | H04L 25/14 375/295 |
| 2008/0247453 A1* | 10/2008 | An | ........................ | H04L 25/028 375/233 |
| 2009/0115389 A1 | 5/2009 | Chu et al. | | |

(Continued)

OTHER PUBLICATIONS

Notice of Allowance, mailed Nov. 16, 2016, for Taiwan Patent Application No. 104120191.

(Continued)

*Primary Examiner* — Alexander H Taningco
*Assistant Examiner* — Kurtis R Bahr
(74) *Attorney, Agent, or Firm* — Green, Howard & Mughal LLP

(57) ABSTRACT

Described is an apparatus for boosting a transition edge of a signal, the apparatus comprises: a logic to provide input data having a Unit Interval (UI); a programmable delay unit to receive the input data and operable to delay the input data by a fraction of the UI to generate a delayed input data; and one or more drivers to drive the input data and the delayed input data to a node.

17 Claims, 9 Drawing Sheets

(56) References Cited

U.S. PATENT DOCUMENTS

| | | | | |
|---|---|---|---|---|
| 2009/0292962 | A1* | 11/2009 | Thurston | G01R 31/31716 714/716 |
| 2010/0177816 | A1* | 7/2010 | Malipatil | H04L 25/03343 375/233 |
| 2012/0166505 | A1* | 6/2012 | Hogeboom | H03H 17/06 708/301 |
| 2013/0287409 | A1* | 10/2013 | Cirit | H04L 25/03063 398/193 |
| 2014/0024255 | A1 | 1/2014 | Robitaille et al. | |
| 2014/0181845 | A1* | 6/2014 | Jing | H04L 25/03878 719/321 |

OTHER PUBLICATIONS

Final Office Action, mailed Dec. 22, 2015, for U.S. Appl. No. 14/446,664.

First Office Action, mailed Jun. 16, 2016, for Taiwan Patent Application No. 104120191.

Non-Final Office Action, mailed Sep. 8, 2015, for U.S. Appl. No. 14/446,664.

Notice of Allowance, mailed Feb. 25, 2016, for U.S. Appl. No.14/446,664.

"SFF-8431 Specifications for Enhanced Small Form Factor Pluggable Module SFP+", SFF Committee, Revision 4.1; Jul. 6, 2009 (132 pages).

Cirit, H. et al., "A 10Gb/s Half=UI IIR-Tap Transmitter in 40nm CMOS", ISSCC 2011 / Session 25 / CDRs & Equalization Techniques / 25.7; 2011 IEEE International Solid-State Circuits Conference.

Kim, S. et al., "A 5.2-Gb/s Low-Swing Voltage-Mode Transmitter With an Ac-/DC-Coupled Equalizer and a Voltage Offset Generator", IEEE Transactions on Circuits and Systems I: Regular Papers, 2003 (13 pages).

First Office Action for Chinese Patent Application No. 201510364757.3, dated Jun. 20, 2017.

* cited by examiner

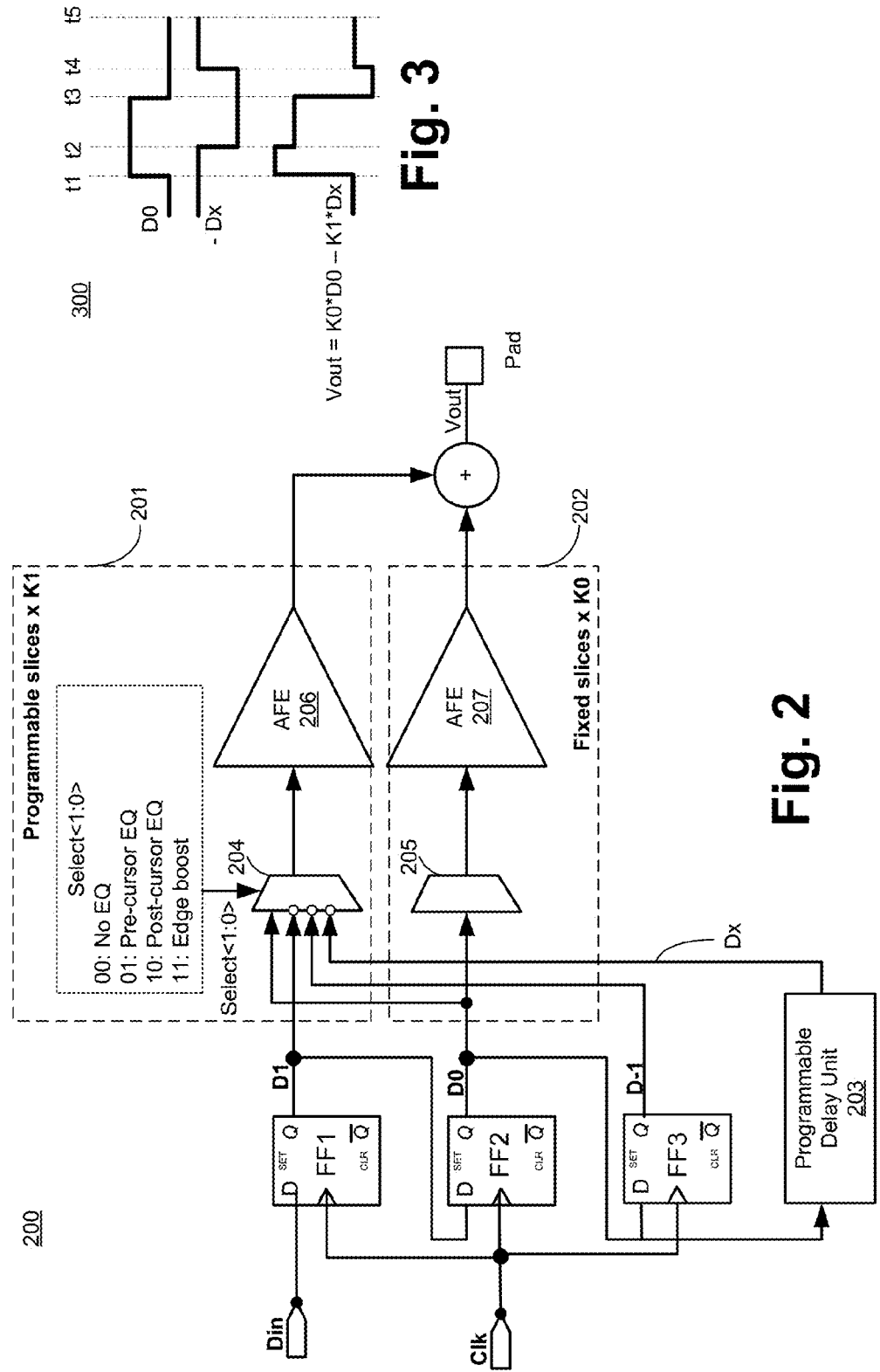

METHOD AND APPARATUS FOR SIGNAL EDGE BOOSTING

CLAIM FOR PRIORITY

This application is a continuation of U.S. patent application Ser. No. 14/446,664, filed on 30 Jul. 2014, titled "METHOD AND APPARATUS FOR SIGNAL EDGE BOOSTING," and issued as U.S. Pat. No. 9,379,743, on Jun. 28, 2016, which is incorporated herein by reference in entirety for all purposes.

BACKGROUND

The Serial Peripheral Interface (SPI) specification requires the transmitter to operate with both low data-dependent jitter (DDJ) and low transmitter waveform dispersion penalty (TWDPc, where the 'c' denotes direct-attach copper cable). SPI specification associated with Small Form Factor Pluggable (SFP+) specification compliant optical modules and copper twin axial cable, and 10 GBASE-KR specification for backplane channels in computer servers and networking equipment are standards for 10 Gb/s serial data transfer.

The SFI TWDPc specification is associated with the copper twin axial cable channel and is defined as the ratio (in dB) between the signal-to-noise ratio (SNR) of a matched-filter receiver and the SNR at the slicer input of an ideal, adapted, FFE+DFE receiver. TWDPc measures the vertical eye openness (i.e., a voltage measure) while DDJ measures the horizontal timing jitter (i.e., a timing measure).

In data center applications, the same serial transmitter integrated circuit (with no change in transmitter programming) is used with both hot-pluggable twin axial cable and optical modules. Because of limiting laser drivers in optical modules, DDJ produced by the transmitter may not be equalized by the receiver at the far-end of an optical fiber link. Therefore, it is useful for the transmitter to satisfy both the SI TWDPc and DDJ specifications at the same time. Satisfying SFI TWDPc and DDJ specifications for the same transmitter design is challenging because optimizing the transmitter design to meet TWDPc may make it harder to meet the DDJ specification.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 2 illustrates a section of a transmitter with an edge boosting apparatus using a programmable delay, according to some embodiments of the disclosure.

FIG. 3 illustrates waveforms showing operation of the edge boosting apparatus, according to some embodiments of the disclosure.

DETAILED DESCRIPTION

Pre-distortion (e.g., equalization (EQ)) is typically used in transmitters to counter the DDJ caused by channel insertion loss. However, DDJ introduced by transmitter equalization (TX-EQ) is not recoverable if the jitter (i.e., DDJ) passes through a limiting amplifier in an optical transceiver module. Therefore, the level of TX-EQ tuned for twin-axial cable may not be optimum for optical fiber in SFP+ applications because there is no mechanism to provide feedback to the transmitter for adjusting the appropriate level of equalization. This is why a stringent DDJ requirement is a key part of SFP+ specifications.

Figure 1:
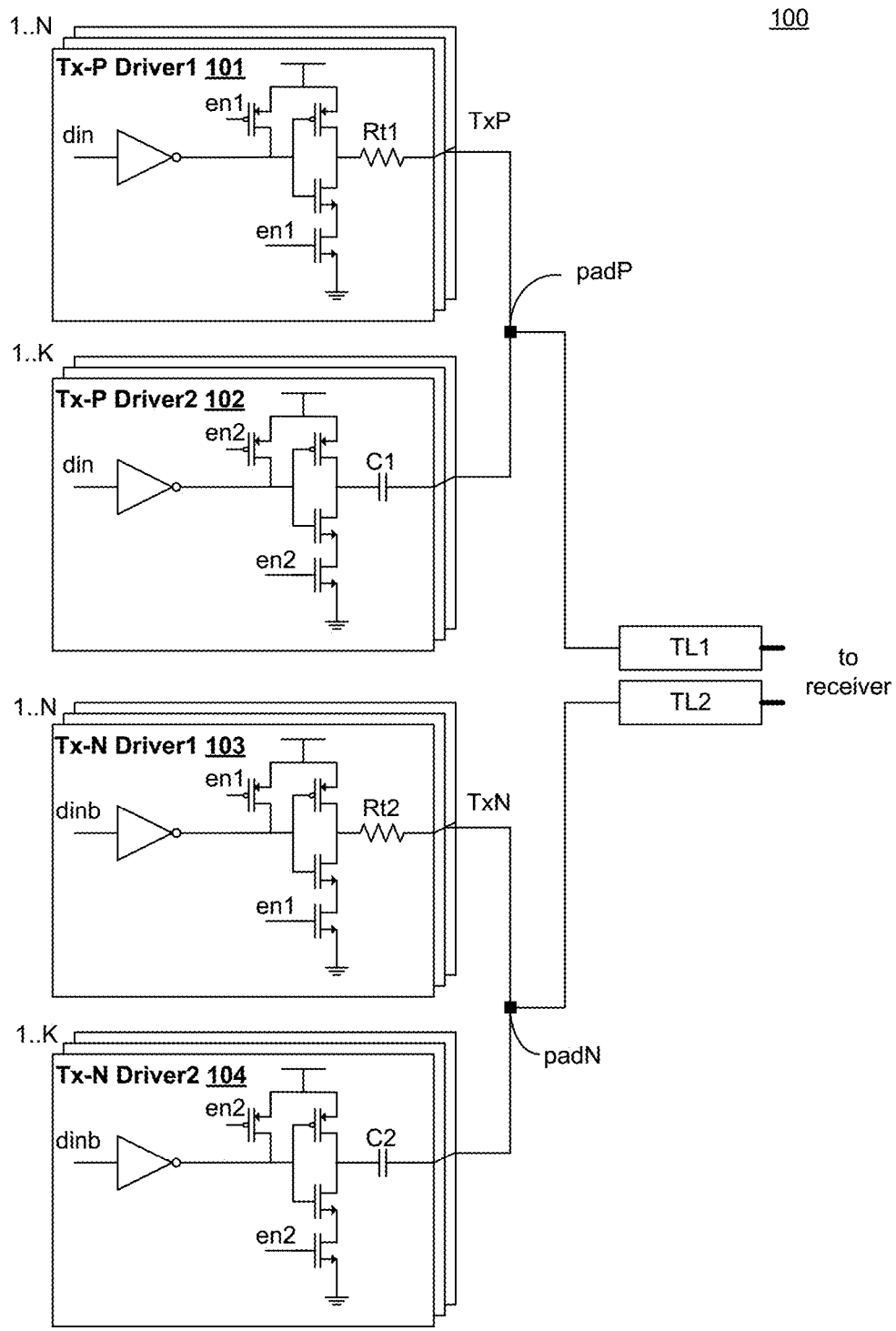
FIG. 1 illustrates a voltage mode transmitter with serial termination resistors and AC coupling capacitors for edge boosting.

One way to meet the stringent requirements of TWDPc and DDJ is to boost edges of the data signal transitions using AC coupling capacitors. FIG. 1 illustrates a voltage mode transmitter 100 with serial termination resistors (Rt1 and Rt2) and AC coupling capacitors (C1 and C2). Voltage mode transmitter 100 comprises 'N' slices of Tx-P Driver1 101, 'K' slices of Tx-P Driver2 102, 'N' slices of Tx-N Driver1 103 and 'K' slices of Tx-N Driver2 104 to provide differential signals TxP and TxN at pads padP and padN, respectively, where 'N' and 'K' are integers. The pads padP and padN are coupled to transmission lines TL1 and TL2, respectively, which are coupled to a receiver (not shown). In one example, each slice is identical in size.

Each Tx-P Driver 101, 102 and Tx-N Drivers 103, 104 includes a buffer driver which can be enabled or disabled using en1/2 signal (i.e., enable signals en1 and en2). Complementary input signals (e.g., din and dinb) are received at the input of the buffers (or inverters). In one example, each slice is enabled by respective enable (en) signal. For example, Tx-P Driver1 101 is enabled by en1 signal, Tx-P Driver2 102 is enabled by en2 signal, Tx-N Driver1 103 is enabled by en1 signal, and Tx-N Driver2 104 is enabled by en2 signal.

Here, AC coupling capacitors C1 and C2 are coupled between outputs of respective drivers and the respective pads. For example, capacitor C1 is coupled to the output of Tx-P Driver2 102 and the pad padP contributing to TxP signal when enabled, and capacitor C2 is coupled to the output of Tx-N Driver2 104 and the pad padN contributing to TxN signal. In this example, the AC coupling capacitors C1 and C2 block DC (direct-current) signals but allow high-frequency components to pass. As such, signals TxP and TxN have boosted transition edges because one or more of the slices which are enabled may provide the effective boosting for signals TxP and TxN.

However, the AC coupling capacitors C1 and C2 add additional pad capacitance to voltage mode transmitter 100.

For example, when all of the edge boosting slices (i.e., slices 1-K) are turned on, the entire AC (alternating current) coupling capacitance will load the transmitter pads (i.e., pads padP and padN) during edge transition. Even when the edge boosting slice is turned off (i.e., slices 1-K are disabled), the parasitic capacitance from the AC coupling capacitor plates still contribute to a sizeable capacitive loading on the pads. More loading on the pads generally means it is harder to meet the high-speed data transfer specifications.

Some embodiments describe a transmitter (voltage-mode or current-mode) that reduces the impact to pad capacitance and provide the necessary programmability to meet the stringent specifications for SFI TWDPc and DDJ specifications. While the embodiments are described with reference to SPI specification, they are not limited to that specification. The embodiments may be used with any transmitter design for any specification. In some embodiments, a transmitter is provided which comprises: a logic to provide input data having a Unit Interval (UI); a programmable delay unit to receive the input data and operable to delay the input data by a fraction of the UI to generate a delayed input data; and one or more drivers to drive the input data and the delayed input data to a node.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 2 illustrates a section 200 of a transmitter with an edge boosting apparatus using programmable delay, according to some embodiments of the disclosure. In some embodiments, section 200 comprises Programmable slices 201, Fixed slices 202, flip-flops (FFs) or samplers FF1, FF2, and FF3, and Programmable Delay Unit 203.

In some embodiments, each slice of Programmable slices 201 comprises multiplexer 204 (e.g., a 4:1 multiplexer) and an analog-front-end (AFE) 206. In some embodiments, each slice of Fixed slices 202 comprises multiplexer 205 and AFE 207. In some embodiments, AFE 206 and AFE 207 have circuits similar to Tx-P Driver1 101 or Tx-N Driver1 103. In other embodiments, other transmitter designs (e.g., voltage mode or current mode transmitter designs) may be used for implementing AFE 206 and AFE 207. In some embodiments, outputs of AFEs 206 and 207 from each slice is coupled together to provide output voltage Vout at Pad. Here, labels for signals and nodes are interchangeably used. For example, Vout may refer to node Vout or signal Vout depending on the context of the sentence.

In some embodiments, data Din is received by FF1 that is clocked by clock signal Clk to generate pre-cursor data sample D1. In some embodiments, pre-cursor data D1 is received as input by FF2 that is also clocked (or sampled) by Clk to generate main-cursor data D0 (also referred here as input data). In some embodiments, main-cursor data D0 is received as input by FF2 that is also clocked by Clk to generate post-cursor data D−1. In some embodiments, main-cursor data D0 is received as input by Programmable Delay Unit 203 to generate delayed data Dx (also referred here as delayed input data). In some embodiments, the delay added to the main-cursor data D0 is a fraction of a UI. For example, the delay added to the main-cursor data D0 is $\frac{1}{8}^{th}$ of the UI. In some embodiments, the delay added by Programmable Delay Unit 203 is programmable by less than a full UI. For example, Programmable Delay Unit 203 is programmable by fine (e.g., 0.1, 0.2 of UI) or coarse delays (e.g., 0.5 or more of a UI but less than a full UI).

In some embodiments, the programmability of Programmable Delay Unit 203 is fuse based. In other embodiments, the programmability of Programmable Delay Unit 203 is non-fuse based (e.g., by programmable registers or software). In some embodiments, the programmable setting of Programmable Delay Unit 203 is set automatically (e.g., at boot-up time). In some embodiments, the programmable setting of Programmable Delay Unit 203 is based on process-voltage-temperature skews. In some embodiments, the programmable setting of Programmable Delay Unit 203 is pre-set to a fixed value based on volume silicon data.

In some embodiments, multiplexer 204 receives as inputs pre-cursor data D1, main-cursor data D0, post-cursor data D−1, and delayed main-cursor data Dx. The circles at the input of multiplexer 204 indicate the inverted version of the input data being received as input for multiplexer 204. In some embodiments, multiplexer 204 is controllable by a Select signal (e.g., two bit Select<1:0>). In some embodiments, when Select<1:0> is 11, Programmable slice 201 takes the input from delayed main-cursor data Dx (i.e., multiplexer 204 selects the inverted version of Dx for inputting to AFE 206) and Fixed slices 202 take in main-cursor data D0 (i.e., multiplexer 205 provides main-cursor data D0 to AFE 207 as input). Here, edge boosting is performed because output of AFE 206 is subtracted from output of AFE 207 to provide edge boosted Vout to Pad.

In some embodiments, the programmable delay of fractional-UI configurability provides flexibility to speed up the edge transition without introducing excessive DDJ, according to some embodiments. In some embodiments, the strength of the fractional-UI is also programmable by controlling Programmable slices 201. For example, the more the Programmable slices receive Dx inputs, the stronger the edge boosting. In some embodiments, multiplexer 205 has substantially the same propagation delay as multiplexer 204. In some embodiments, multiplexer 205 is identical to multiplexer 204 and is configured such that main-cursor data D0 is selected as input for AFE 207.

In some embodiments, edge boosting can be mixed with pre-cursor and/or post-cursor EQ. In some embodiments, FIR (finite-impulse-response) EQ may help DDJ and TWDPc before excessive jitter interfaces with an optical module. In some embodiments, when Select<1:0> is 00, Programmable slice 201 takes the input from the main-cursor data D0 (i.e., multiplexer 204 selects the main-cursor data D0 for inputting to AFE 206. No equalization (EQ) is performed in this case). In some embodiments, when Select<1:0> is 01, Programmable slice 201 takes the input from the pre-cursor data D1 (i.e., multiplexer 204 selects the inverted version of pre-cursor data D1 for inputting to AFE 206. Pre-cursor EQ is performed in this case). In some embodiments, when Select<1:0> is 10, Programmable slice 201 takes the input from the post-cursor D-1 (i.e., multiplexer 204 selects the inverted version of post-cursor data D-1 for inputting to AFE 206. Post-cursor EQ is performed in this case).

FIG. 3 illustrates waveforms 300 showing operation of the edge boosting apparatus, according to some embodiments of the disclosure. It is pointed out that those elements of FIG. 3 having the same reference numbers (or names) as the elements of any other figure can operate or function in any manner similar to that described, but are not limited to such.

Here, x-axis is time and y-axis for each waveform is voltage. The waveform on the top is the main-cursor data D0 followed by an inverted version of the delayed main-cursor data Dx (i.e., −Dx), and then the output voltage Vout. Waveform Dx is subtracted from the waveform D0 to generate Vout, where Vout=K0*D0−K1*Dx, and where "K0" are the number of Fixed Slices 202 and "K1" are the number of Programmable slices 201 that selects Dx as the input. The duration between time points t1 and t3 is one UI. By subtracting waveform Dx from waveform D0, edge boosting is realized on the rising edge of Vout which is indicated by a high Vout level between time points t1 and t2 and a lower Vout level between time points t2 and t3. Similarly, by subtracting waveform Dx from waveform D0, edge boosting is realized on the falling edge of Vout which is indicated by a low Vout level between time points t3 and t4 and a higher Vout level between time points t4 and t5.

Figure 4:
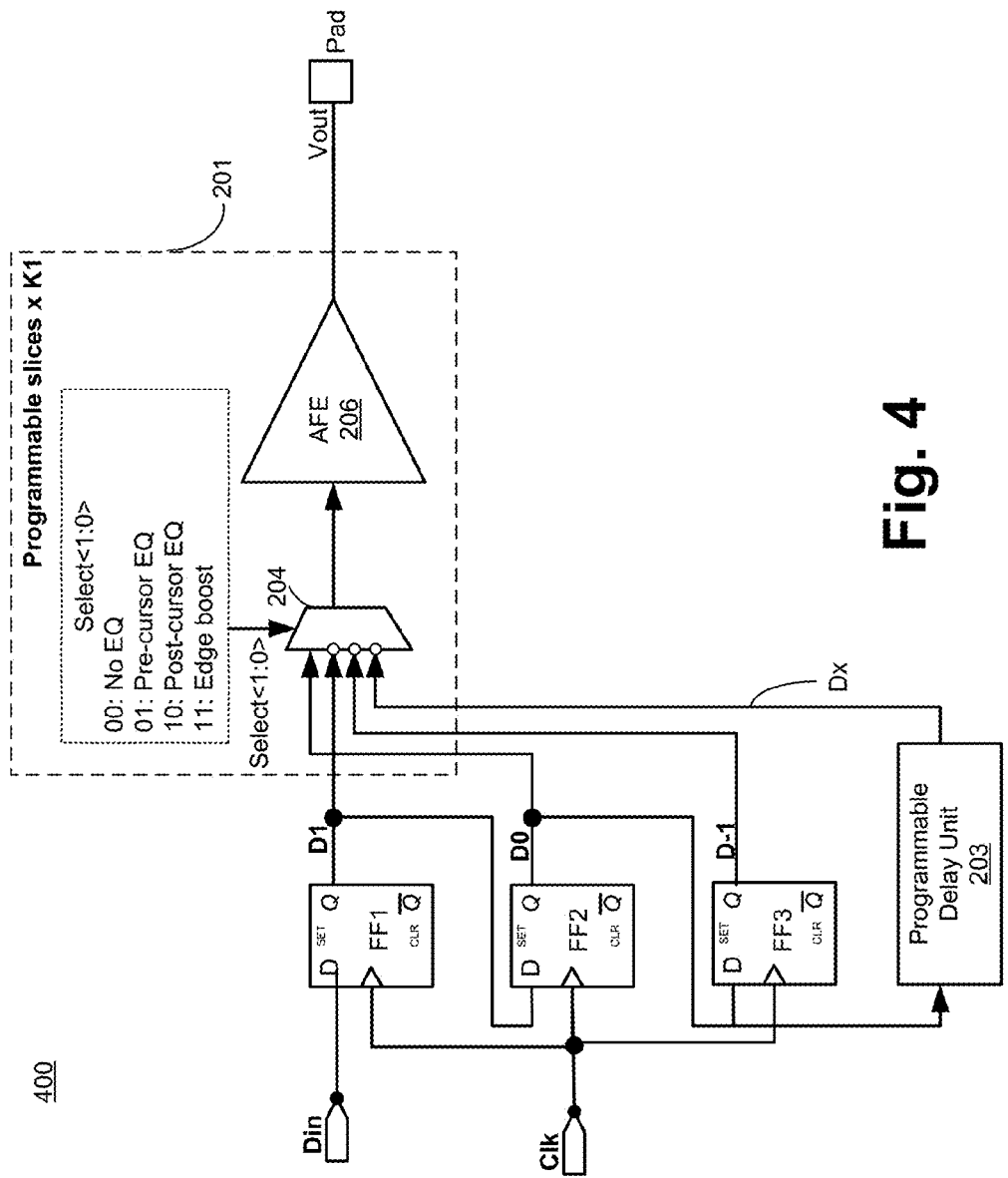
FIG. 4 illustrates a section of a transmitter with an edge boosting apparatus using a programmable delay, according to some embodiments of the disclosure.

FIG. 4 illustrates a section 400 of a transmitter with an edge boosting apparatus using a programmable delay, according to some embodiments of the disclosure. It is pointed out that those elements of FIG. 4 having the same reference numbers (or names) as the elements of any other figure can operate or function in any manner similar to that described, but are not limited to such. So as not to obscure the embodiments, differences between FIG. 4 and FIG. 2 are described. Compared to FIG. 2, in some embodiments, Fixed slices 202 are removed and Programmable slices 201 are used to provide edge boosting on Vout such that one or more Programmable slices 201 drive delayed main-cursor data Dx on Vout while other Programmable slices 201 drive the main-cursor data D0 and/or any combination of the pre-cursor data D1 and the post-cursor data D−1.

For example, multiplexers 204 of some Programmable slices 201 are set to provide the main-cursor data D0 (e.g., by setting Select<1:0> to 00) to AFE 206 of those programmable slices. In some embodiments, multiplexers 204 of some Programmable slices 201 are set to provide the delayed main-cursor data Dx (e.g., by setting Select<1:0> to 11) to AFE 206 of those programmable slices for edge boosting. In some embodiments, multiplexers 204 of some Programmable slices 201 are set to provide the pre-cursor data D1 (e.g., by setting Select<1:0> to 01) to AFE 206 of those programmable slices for pre-cursor EQ. In some embodiments, multiplexers 204 of some Programmable slices 201 are set to provide the post-cursor data D-1 (e.g., by setting Select<1:0> to 10) to AFE 206 of those programmable slices for post-cursor EQ.

Figure 5:
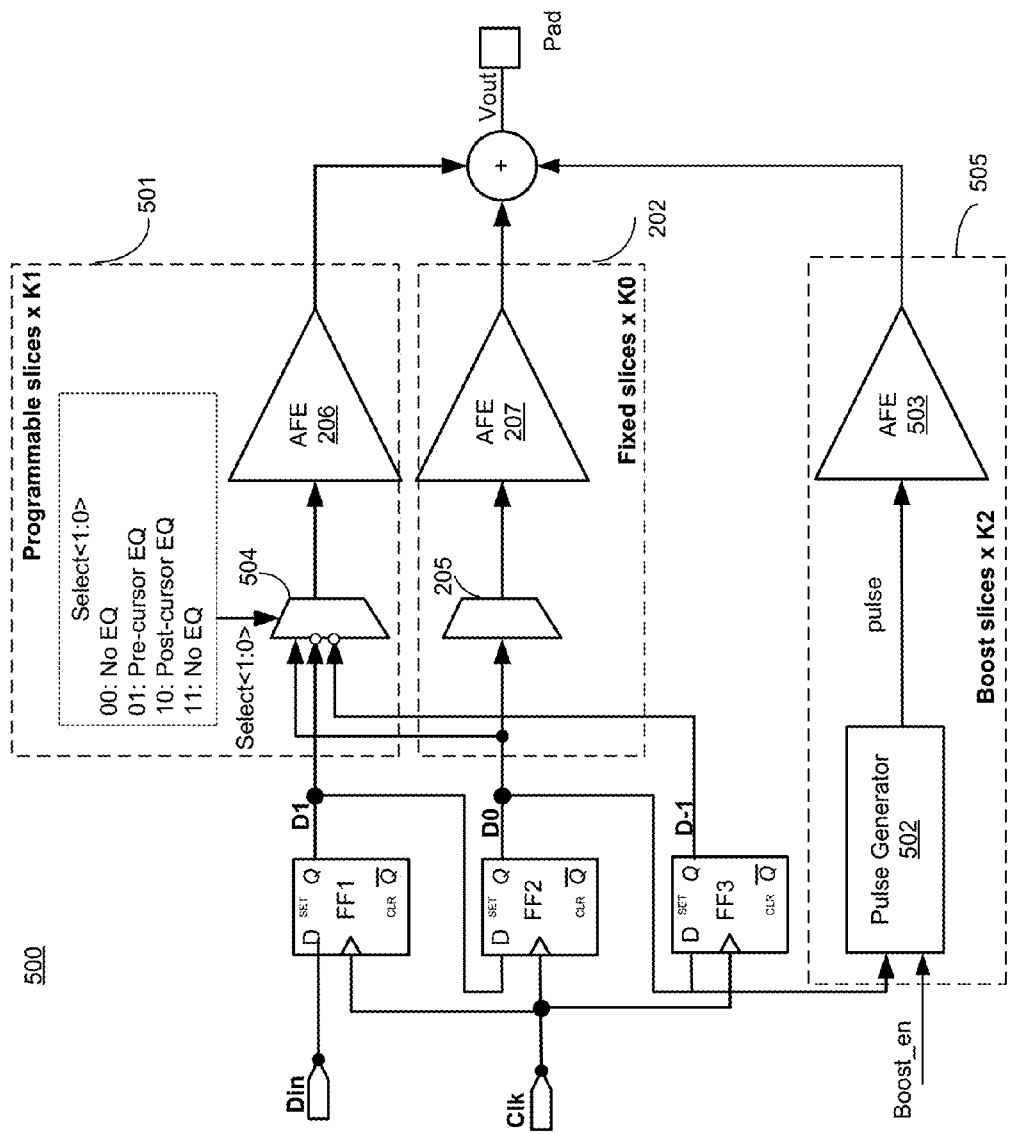
FIG. 5 illustrates a section of a transmitter with an edge boosting apparatus using a pulse generator, according to some embodiments of the disclosure.

FIG. 5 illustrates a section 500 of a transmitter with an edge boosting apparatus using pulse generators, according to some embodiments of the disclosure. It is pointed out that those elements of FIG. 5 having the same reference numbers (or names) as the elements of any other figure can operate or function in any manner similar to that described, but are not limited to such.

So as not to obscure the embodiments, differences between FIG. 2 and FIG. 5 are described. In some embodiments, section 500 comprises Programmable slices 501 which are similar to Programmable slices 201 but for removing Dx data input from multiplexer 204. In some embodiments, multiplexer 203 is replaced by multiplexer 504 which is operable to select pre-cursor data D1, main-cursor data D0, or post-cursor data D−1 as input for AFE 206.

In some embodiments, Programmable slices 501 are used to provide pre-cursor/post-cursor EQ or no EQ with any combination on Vout. For example, multiplexers 504 of some Programmable slices 501 are set to provide the main-cursor data D0 (e.g., by setting Select<1:0> to 00 or 11) to AFE 206 of those programmable slices with no EQ. In some embodiments, multiplexers 504 of some Programmable slices 501 are set to provide pre-cursor data D1 (e.g., by setting Select<1:0> to 01) to AFE 206 of those programmable slices for pre-cursor EQ. In some embodiments, multiplexers 204 of some Programmable slices 504 are set to provide post-cursor data D-1 (e.g., by setting Select<1:0> to 10) to AFE 206 of those programmable slices for post-cursor EQ. In some embodiments, multiplexer 504 is a 3:1 multiplexer (e.g., Select<1:0> setting of 11 results in no action). In some embodiments, multiplexer 504 is a 4:1 multiplexer with an extra usable select input (e.g., Select<1: 0> setting of 11) which can be used to provide main-cursor data D0.

In some embodiments, additional Boost slices 505 (i.e., K2 number of slices) are added that provide edge boosting to signal Vout. In some embodiments, each additional Boost slice 505 comprises Pulse Generator 502 and AFE 503 coupled together as shown.

In some embodiments, Pulse Generator 502 receives the main-cursor data DO and generates a pulse for AFE 503 to enable AFE 503 to boost the edge of signal Vout. In some embodiments, when edge boosting is needed, Pulse Generator 502 is enabled by Boost_en signal such that one or more of the additional slices 505 are enabled for a short duration (depending on the pulse width) when there is a bit transition on Vout. In some embodiments, the duration (i.e., width of the pulse) is programmable by a tunable delay similar to Programmable Delay 203 (i.e., Pulse Generator 502 has a programmable setting). In some embodiments, the programmability is fuse based. In other embodiments, the programmability is non-fuse based (e.g., by programmable registers or software).

Pulse Generator 502 can be implemented in various ways. In some embodiments, the programmable setting of Pulse Generator 502 is set automatically (e.g., at boot-up time). In some embodiments, the programmable setting of Pulse Generator 502 is based on process-voltage-temperature skews. In some embodiments, the programmable setting of Pulse Generator 502 is pre-set to a fixed value based on volume silicon data.

Figure 6:
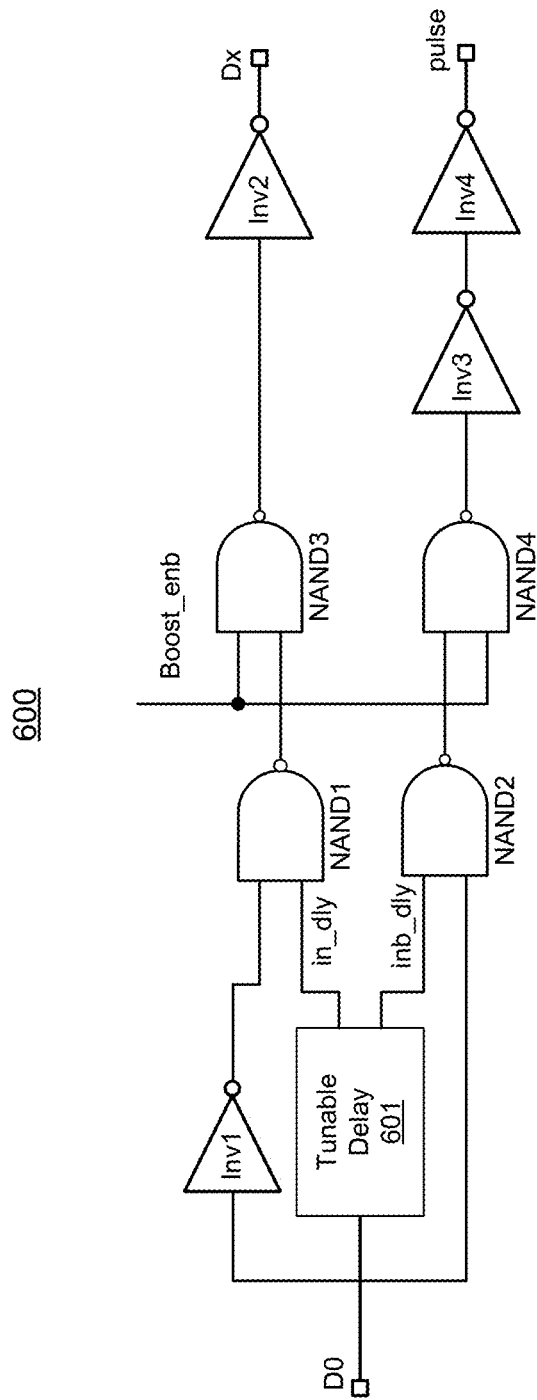
FIG. 6 illustrates a pulse generator, according to some embodiments of the disclosure.

FIG. 6 illustrates a pulse generator 600 (e.g., Pulse Generator 502), according to some embodiments of the disclosure. It is pointed out that those elements of FIG. 6 having the same reference numbers (or names) as the elements of any other figure can operate or function in any manner similar to that described, but are not limited to such.

In some embodiments, pulse generator 600 comprises Tunable Delay 601, inverters Inv1, Inv2, Inv3, and Inv4, NAND gates NAND1, NAND2, NAND3 and NAND4 coupled together as shown. In some embodiments, input data D0 (i.e., main-cursor data D0) is received by Tunable Delay 601 which generates delayed output in_dly and its inverted version inb_dly. One signal path provides output Dx which is coupled to the data input of AFE 503, while the other signal path provides the output pulse which is used to enable or disable AFE 503. Other implementations for Pulse Generator 502 may also be used.

One implementation of an AFE is shown with reference to FIG. 1, where din node receives delayed main-cursor data Dx, and the pulse is received by node en2. While the embodiments here show a single input being received by the AFEs, one or more signals may be received by the AFEs depending on the implementation of the AFEs. Referring back to FIG. 6, in some embodiments, edge boosting is disabled using the Boost_en signal (or its inverted version, Boost_enb) as shown.

Figure 7:
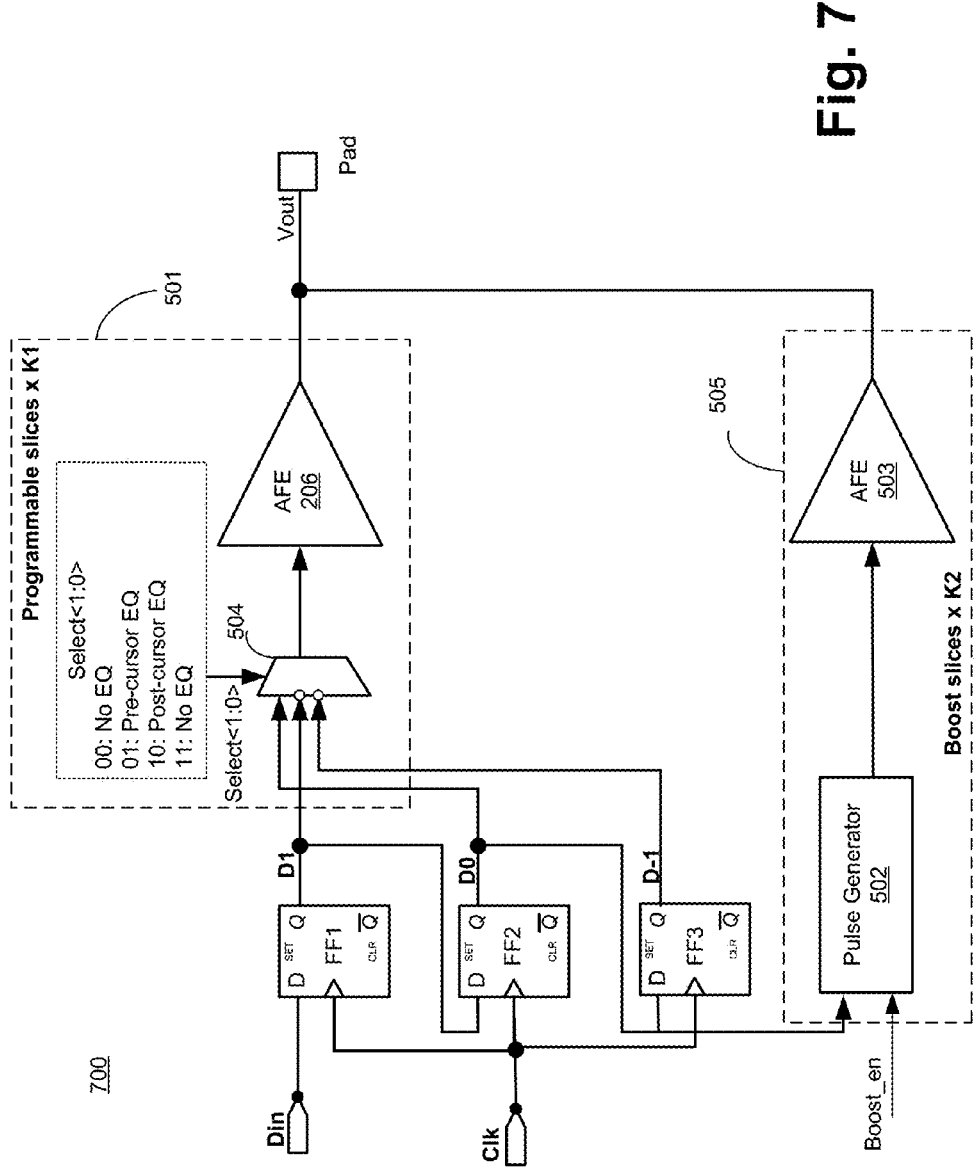
FIG. 7 illustrates a section of a transmitter with an edge boosting apparatus using a pulse generator, according to some embodiments of the disclosure.

FIG. 7 illustrates a section 700 of a transmitter with an edge boosting apparatus using pulse generators, according to some embodiments of the disclosure. It is pointed out that those elements of FIG. 7 having the same reference numbers (or names) as the elements of any other figure can operate or function in any manner similar to that described, but are not limited to such. FIG. 7 is described with reference to FIG. 5 and FIG. 4.

In some embodiments, Fixed slices 202 can be removed and integrated as part of the Programmable slices 501 as described with reference to FIG. 4 and FIG. 5. Unlike the embodiments of FIG. 5, edge boosting is provided by Boost slices 505, according to some embodiments.

Figure 8:
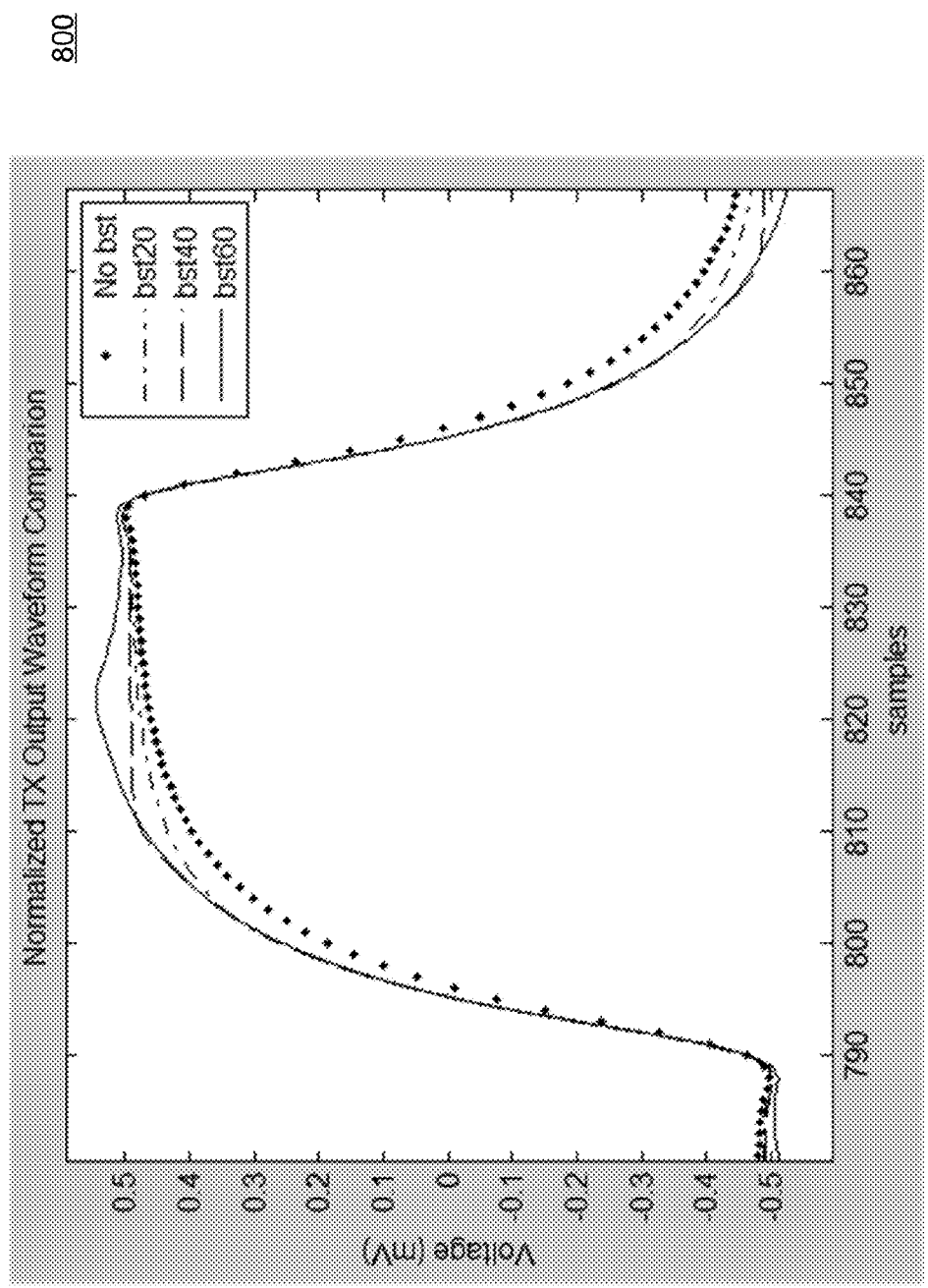
FIG. 8 illustrates a plot showing waveforms for various delay settings for a programmable delay unit of the edge boosting apparatus relative to no edge boosting, according to some embodiments of the disclosure.

FIG. 8 illustrates a plot 800 showing waveforms for various delay settings for a programmable delay unit of the edge boosting apparatus, according to some embodiments of the disclosure. It is pointed out that those elements of FIG. 8 having the same reference numbers (or names) as the elements of any other figure can operate or function in any manner similar to that described, but are not limited to such.

Here, x-axis is samples and y-axis is voltage (in mV). In plot 800, four waveforms are shown including waveform with no edge boosting (i.e., No bst) and waveforms with edge boosting according to various delay settings—20 ps (i.e., bst20), 40 ps (i.e., bst40), and 60 ps (i.e., bst60), where a UI is 100 ps or 50 samples in this example. The rising and falling edges of the waveforms show that as the delay of Programmable Delay Unit 203 or Tunable Delay 601 of Pulse Generator 600/502 is increased, the rate of transition edges of the waveforms increases (i.e., the edges are boosted). The boosted edges improve DDJ and TWDPc as shown in the eye diagram of FIG. 9. Too much delay added to Dx may not further improve the edge rate, but instead may degrade the vertical eye margin (TWDPc) in some embodiments.

Figure 9:
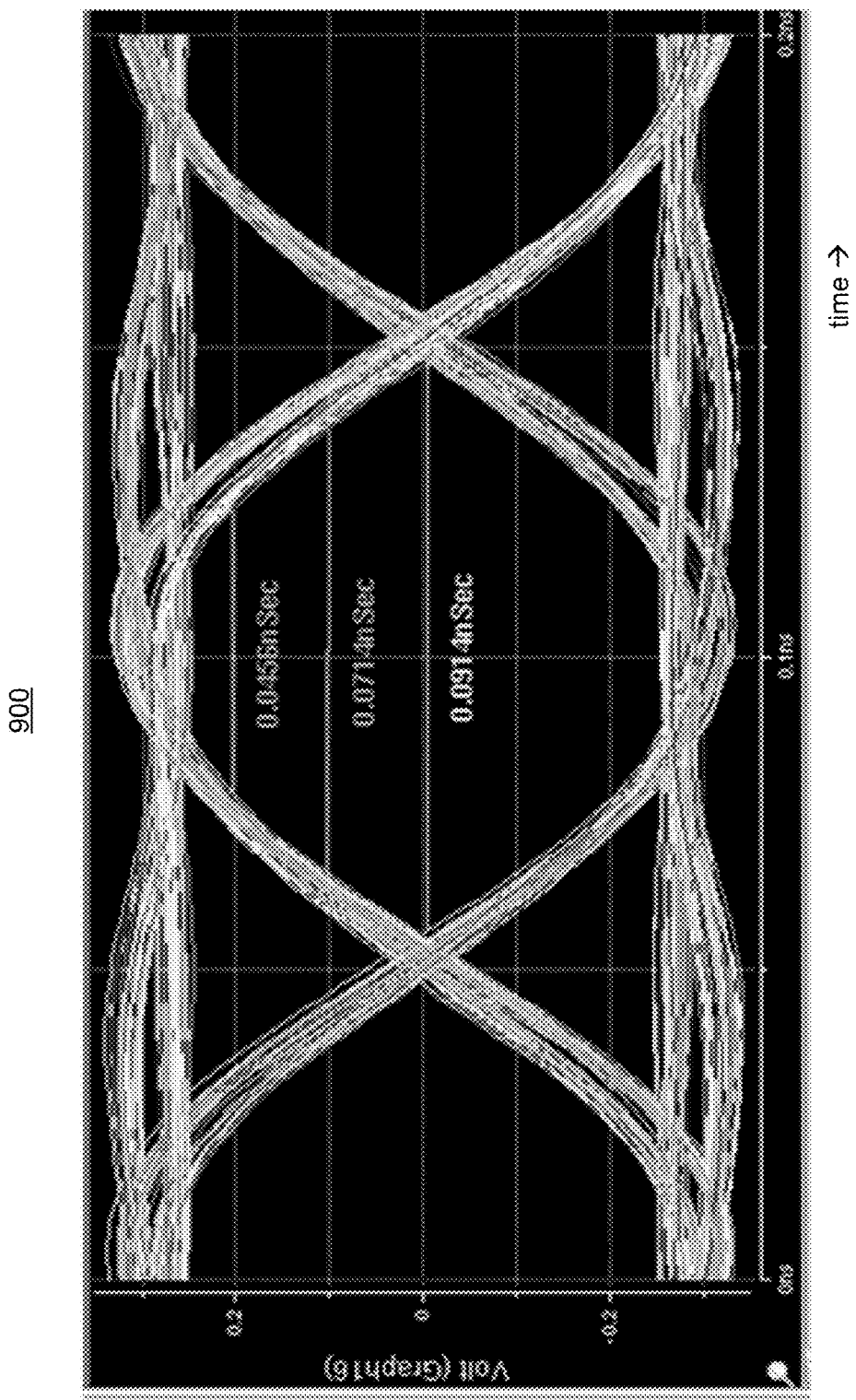
FIG. 9 illustrates a plot showing an eye diagram formed using a delay setting for the programmable delay unit of the edge boosting apparatus with eye width measurements at various voltage levels, according to some embodiments of the disclosure.

FIG. 9 illustrates a plot 900 showing an eye diagram formed using one delay setting for the Programmable Delay Unit 203 or Tunable Delay 601 of the edge boosting apparatus, according to some embodiments of the disclosure. It is pointed out that those elements of FIG. 9 having the same reference numbers (or names) as the elements of any other figure can operate or function in any manner similar to that described, but are not limited to such.

Here, x-axis is time and y-axis is voltage. This example eye diagram is captured for SFI specification compliant TX according to some embodiments. The eye width is measured at 0 mV, 100 mV, and 200 mV levels. The eye height is captured with different edge boosting delay settings (e.g., 0 ps, 25 ps, 50 ps, and 75 ps). Results are summarized in Table 1 and Table 2.

TABLE 1

Eye width improvement with edge boosting using some embodiments

| TX FIR | Horizontal Eye Margin | | | |
|---|---|---|---|---|
| EQ disabled Voltage level | No Edge Boosting | Delay 25 ps | Delay 50 ps | Delay 75 ps |
| 0 mV | 85.1 | 86.1 | 87.1 | 87.8 |
| 100 mV | 66.5 | 68.2 | 70 | 71.4 |
| 200 mV | 35.4 | 40.7 | 43.8 | 46.7 |

TABLE 2

Eye height improvement with edge boosting using some embodiments

| TX FIR EQ disabled (mV) | No Edge Boosting | Vertical Eye Margin (i.e., voltage margin) | | |
|---|---|---|---|---|
| | | Delay 25 ps | Delay 50 ps | Delay 75 ps |
| up limit | 248.2 | 264 | 277.1 | 290 |
| low limit | −251.6 | −266.5 | −280.7 | −300.9 |
| height | 499.8 | 530.5 | 557.8 | 590.9 |
| height improvement | 0 | 30.7 | 58 | 91.1 |

Table 1 shows improvement in eye width across different voltage levels as delay is added by Programmable Delay Unit 203 or Tunable Delay 601 of the edge boosting apparatus relative to no edge boosting. For example, an improvement of over 11 ps (i.e., 46.7 ps-35.4 ps) at 200 mV voltage level is seen in horizontal eye margin when 75 ps of delay is added. Table 2 shows improvement in eye height as delay is added by Programmable Delay Unit 203 or Tunable Delay 601 of the edge boosting apparatus relative to no edge boosting. For example, an improvement of over 90 ps is seen in vertical eye margin when 75 ps of delay is added.

Figure 10:
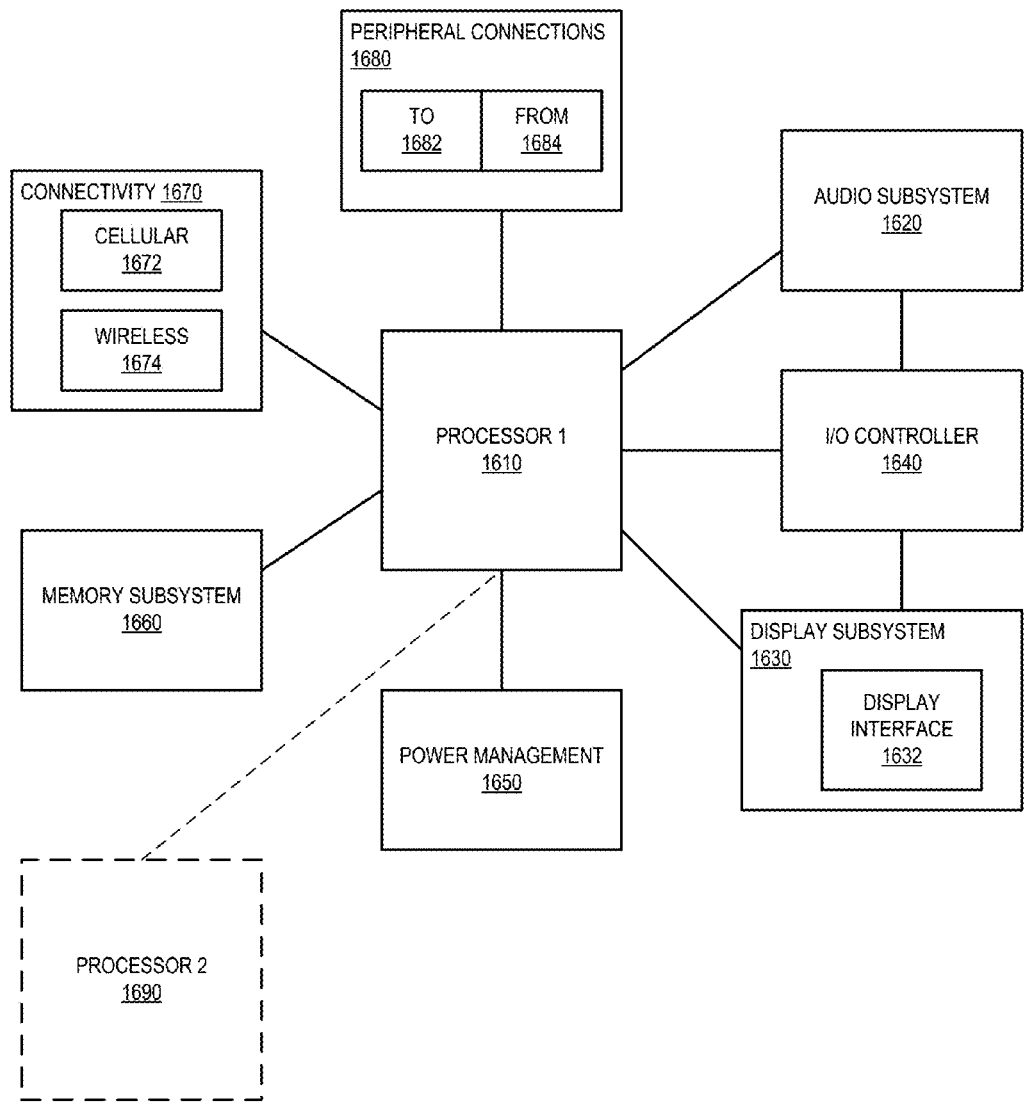
FIG. 10 illustrates a smart device or a computer system or a SoC (System-on-Chip) with an edge boosting apparatus, according to some embodiments of the disclosure.

FIG. 10 illustrates a smart device or a computer system or a SoC (System-on-Chip) with an edge boosting apparatus, according to some embodiments of the disclosure. It is pointed out that those elements of FIG. 10 having the same reference numbers (or names) as the elements of any other figure can operate or function in any manner similar to that described, but are not limited to such.

FIG. 10 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with edge boosting apparatus, according to some embodiments discussed. Other blocks of the computing device 1600 may also include the edge boosting apparatus of some embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display M.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a logic to provide input data having a UI; a programmable delay unit to receive the input data and operable to delay the input data by a fraction of the UI to generate a delayed input data; and one or more drivers to drive the input data and the delayed input data to a node. In some embodiments, the programmable delay unit is operable to delay the input data by a fine or coarse delay. In some embodiments, the apparatus comprises logic to provide pre-cursor data relative to the input data. In some embodiments, the apparatus comprises logic to provide post-cursor data relative to the input data.

In some embodiments, the node is electrically coupled to a pad of a silicon chip. In some embodiments, the programmable delay unit is part of a pulse generator. In one embodiment, the apparatus comprises logic to disable the pulse generator. In some embodiments, wherein the one or more drivers comprise: a first set of drivers to receive the input data, the first set of drivers having an output coupled to the node; and a second set of drivers, some of which to receive the delayed input data, the second set of drivers having an output coupled to the node.

In one embodiment, the apparatus comprises a set of multiplexers coupled to the second set of drivers. In some embodiments, the set of multiplexers to receive pre-cursor data, the input data, post-cursor data, and the delayed input data. In some embodiments, each of the multiplexers in the set of multiplexers is operable to select one of the pre-cursor data, the input data, the post-cursor data, and the delayed input data for input to a driver of the second set of drivers coupled to that multiplexer.

In another example, a system is provided which comprises: a memory; a processor coupled to the memory, the processor including a transmitter which comprises: a logic to provide input data having a UI; a programmable delay unit to receive the input data and operable to delay the input data by a fraction of the UI to generate a delayed input data; and one or more drivers to drive the input data and the delayed input data to a node; and a wireless interface for allowing the processor to communicatively couple with another device.

In some embodiments, the transmitter is compliant to Small Form Factor Pluggable specification. In some embodiments, the system comprises a display interface for allowing content processed by the processor to be displayed on a display unit. In some embodiments, the transmitter comprises an apparatus described above.

In another example, a system is provided which comprises: a memory; a processor coupled to the memory, the processor including a transmitter having apparatus which is described above; and a wireless interface for allowing the processor to communicatively couple with another device. In some embodiments, the transmitter is compliant to Small Form Factor Pluggable specification. In some embodiments, the system comprises a display interface for allowing content processed by the processor to be displayed on a display unit.

In another example, an apparatus is provided which comprises: a pad; a logic to provide input data having a UI; a programmable delay unit to receive the input data and operable to delay the input data by a fraction of the UI to generate a delayed input data; and one or more drivers to drive the input data and the delayed input data to the pad. In some embodiments, the apparatus comprises: a first set of drivers to receive the input data, the first set of drivers having an output coupled to the pad; and a second set of drivers, some of which to receive the delayed input data, the second set of drivers having an output coupled to the pad.

In some embodiments, the apparatus comprises: a first set of multiplexers coupled to the second set of drivers. In some embodiments, the first set of multiplexers to receive pre-cursor data, the input data, post-cursor data, and the delayed input data. In one embodiment, each of the multiplexers in the first set of multiplexers is operable to select one of the pre-cursor data, the input data, the post-cursor data, and the delayed input data for input to a driver of the second set of drivers coupled to that multiplexer. In some embodiments, the programmable delay unit is operable to delay the input data by a fine or coarse delay. In some embodiments, the apparatus comprises a second set of multiplexers coupled to the first set of drivers, wherein the second set of multiplexers has a propagation delay which is substantially equal to the propagation delay of the first set of multiplexers.

In another example, a method is provided which comprises: providing input data having a UI; receiving the input data by a programmable delay unit; delaying the input data by a fraction of the UI to generate a delayed input data; and driving the input data and the delayed input data to a node. In some embodiments, wherein delaying the input data comprises delaying the input data by a fine or coarse delay.

In some embodiments, the method comprises providing pre-cursor data relative to the input data.

In some embodiments, the method comprises providing post-cursor data relative to the input data. In some embodiments, the method comprises electrically coupling the node to a pad of a silicon chip. In some embodiments, driving the input data and the delayed input data comprises: receiving the input data by a first set of drivers having an output coupled to the node; and receiving the delayed input data by some second set of drivers, the second set of drivers having an output coupled to the node.

In some embodiments, the method comprises coupling a set of multiplexers to the second set of drivers. In some embodiments, the method comprises receiving pre-cursor data, the input data, post-cursor data, and the delayed input data by the set of multiplexers. In some embodiments, the method comprises selecting, by each multiplexer in the set of multiplexers, one of the pre-cursor data, the input data, the post-cursor data, and the delayed input data for input to a driver of the second set of drivers coupled to that multiplexer.

In another example, an apparatus is provided which comprises: means for providing input data having a UI; means for receiving the input data by a programmable delay unit; means for delaying the input data by a fraction of the UI to generate a delayed input data; and means for driving the input data and the delayed input data to a node. In some embodiments, the means for delaying the input data comprises means for delaying the input data by a fine or coarse delay. In some embodiments, the apparatus comprises means for providing pre-cursor data relative to the input data. In some embodiments, the apparatus comprises means for providing post-cursor data relative to the input data.

In some embodiments, the apparatus comprises means for electrically coupling the node to a pad of a silicon chip. In some embodiments, the means for driving the input data and the delayed input data comprises: means for receiving the input data by a first set of drivers having an output coupled to the node; and means for receiving the delayed input data by some second set of drivers, the second set of drivers having an output coupled to the node.

In some embodiments, the apparatus comprises means for coupling a set of multiplexers to the second set of drivers. In some embodiments, the apparatus comprises means for receiving pre-cursor data, the input data, post-cursor data, and the delayed input data by the set of multiplexers. In some embodiments, the apparatus comprises means for selecting, by each multiplexer in the set of multiplexers, one of the pre-cursor data, the input data, the post-cursor data, and the delayed input data for input to a driver of the second set of drivers coupled to that multiplexer.

In another example, a system is provided which comprises: a memory; a processor coupled to the memory, the processor including a transmitter having apparatus according to the apparatus described above; and a wireless interface for allowing the processor to communicatively couple with another device. In some embodiments, the transmitter is compliant to Small Form Factor Pluggable specification. In some embodiments, the system comprises a display interface for allowing content processed by the processor to be displayed on a display unit.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a first flip-flop (FF) to receive data and to provide a first output which is a sampled version of the data;
a second FF to receive the first output and to provide a second output which is a sampled version of the first output;
a third FF to receive the second output and to provide a third output which is a sampled version of the second output;
a programmable delay logic coupled to the third FF, wherein the programmable delay logic is to provide a fourth output which is a delayed version of the second output; and
a first multiplexer operable to select one of the first, second, third, and fourth outputs as an output for one or more drivers.

2. The apparatus of claim 1, further comprising:
a second multiplexer which is operable to select the fourth output for the one or more drivers.

3. The apparatus of claim 1, wherein the one or more drivers are part of an analog front-end (AFE).

4. The apparatus of claim 1, wherein the one or more drivers are one of voltage-mode or current-mode drivers.

5. The apparatus of claim 1, wherein the programmable delay logic is operable to provide a programmable delay to the second output.

6. An apparatus comprising:
a first flip-flop (FF) to receive data and to provide a first output which is a sampled version of the data;
a second FF to receive the first output and to provide a second output which is a sampled version of the first output;
a third FF to receive the second output and to provide a third output which is a sampled version of the second output;
a first set of multiplexers operable to select one of the first, second, and third outputs as an output for a first set of drivers; and
a second set of multiplexers operable to always receive the second output of the first, second, or third outputs, and to provide the second output to a second set of drivers,
wherein the first set of multiplexers is independent and separate from the second set of multiplexers.

7. The apparatus of claim 6 comprises a pulse generator to generate a pulse according to the second output.

8. The apparatus of claim 7 comprises a third set of drivers to receive the pulse.

9. The apparatus of claim 8, wherein the first set of multiplexers has a first propagation delay that is substantially similar to a second propagation delay of the second set of multiplexers.

10. The apparatus of claim 8, wherein the pulse generator comprises a tunable delay, NAND gates, and inverters, and wherein the tunable delay is to receive the second output.

11. The apparatus of claim 8, wherein at least one of the first, second, or third sets of drivers are part of an analog front-end (AFE).

12. The apparatus of claim 8, wherein at least one of the first, second, or third sets of drivers are one of voltage-mode or current-mode drivers.

13. The apparatus of claim 7, wherein the pulse generator is operable to be enabled.

14. A system comprising:
a memory;
a processor coupled to the memory, the processor including a transmitter which comprises:
a first flip-flop (FF) to receive data and to provide a first output which is a sampled version of the data;
a second FF to receive the first output and to provide a second output which is a sampled version of the first output;
a third FF to receive the second output and to provide a third output which is a sampled version of the second output;
a programmable delay logic coupled to the third FF, wherein the programmable delay logic is to provide a fourth output which is a delayed version of the second output;
a first multiplexer which is operable to select the fourth output for one or more drivers; and
a second multiplexer which is operable to select one of the first, second, and third outputs for the one or more drivers, wherein the first multiplexer has a first propagation delay that is substantially similar to a second propagation delay of the second multiplexer;
a wireless interface for allowing the processor to communicatively couple with another device.

15. The system of claim 14, wherein the transmitter is compliant with one or more of:
Small Form Factor Pluggable specification; or
Serial Peripheral Interface (SPI) specification with low data-dependent jitter (DDJ).

16. The system of claim 14 comprises a display interface for allowing content processed by the processor to be displayed on a display unit.

17. The system of claim 14, wherein the one or more drivers are one of voltage-mode or current-mode drivers.

* * * * *